(12) United States Patent
Sebor et al.

(10) Patent No.: US 9,675,913 B1
(45) Date of Patent: Jun. 13, 2017

(54) SWIMMING POOL CLEANER INLINE DEBRIS TRAP AND ASSOCIATED METHODS

(71) Applicants: Pavel Sebor, Heathrow, FL (US); Robert Sebor, Lake Mary, FL (US)

(72) Inventors: Pavel Sebor, Heathrow, FL (US); Robert Sebor, Lake Mary, FL (US)

(*) Notice: Subject to any disclaimer, the term of this patent is extended or adjusted under 35 U.S.C. 154(b) by 0 days.

(21) Appl. No.: 15/170,303

(22) Filed: Jun. 1, 2016

(51) Int. Cl.
| | |
|---|---|
| *B01D 29/23* | (2006.01) |
| *E04H 4/16* | (2006.01) |
| *C02F 1/00* | (2006.01) |
| *B01D 35/30* | (2006.01) |
| *B01D 36/02* | (2006.01) |
| *E04H 4/12* | (2006.01) |
| *C02F 103/42* | (2006.01) |

(52) U.S. Cl.
CPC ............. *B01D 29/23* (2013.01); *B01D 35/30* (2013.01); *B01D 36/02* (2013.01); *C02F 1/001* (2013.01); *E04H 4/1245* (2013.01); *E04H 4/1272* (2013.01); *E04H 4/1654* (2013.01); *C02F 2103/42* (2013.01); *C02F 2201/004* (2013.01)

(58) Field of Classification Search
CPC ........ B01D 29/23; B01D 36/02; B01D 35/30; C02F 1/001; C02F 2103/42; C02F 2201/004; E04H 4/1272; E04H 4/1245; E04H 4/1654
USPC ................. 210/167.1, 167.19, 232, 446, 448
See application file for complete search history.

(56) References Cited

U.S. PATENT DOCUMENTS

| 2,605,902 A | * | 8/1952 | Curtis ................. B01D 35/005 |
| | | | 210/423 |
| 3,011,643 A | | 12/1961 | Mccoy |
| 3,178,024 A | | 4/1965 | Candido |
| 3,252,575 A | | 5/1966 | Jacuzzi |
| 3,640,390 A | | 2/1972 | Goy et al. |
| 5,269,913 A | | 12/1993 | Atkins |

(Continued)

FOREIGN PATENT DOCUMENTS

| CN | 202289676 U | 7/2012 |
| CN | 202315518 U | 7/2012 |
| CN | 102372359 B | 11/2012 |

OTHER PUBLICATIONS

Hayward EC65A D.E. Complete Pool Filter; http://www.amazon.com/Hayward-EC65A-Complete-Pool-Filter/dp/B000FNAN7M, publication dated unknown.

(Continued)

*Primary Examiner* — Fred Prince
(74) *Attorney, Agent, or Firm* — Christopher M. Ramsey; GrayRobinson, P.A.

(57) ABSTRACT

A debris trap useful is a swimming pool cleaning system includes a container having an open end and an opposing closed end, wherein the closed end wall includes an outlet port. A cover includes an arcuate shaped outside surface and an open end. The open end is defined by a cover rim dimensioned from mating with the open end of the container. The cover includes an inlet port extending therethrough. A coupling is pivotally connected to the container and has an arm extending over the cover outside surface and contoured therewith. The arm is rotatable from a locked position for biasing the cover to the container to an unlocked position permitting removal of the cover from the container to facilitate easily removal of a filter basket carried within the container.

19 Claims, 12 Drawing Sheets

(56) References Cited

U.S. PATENT DOCUMENTS

| | | | |
|---|---|---|---|
| 5,338,446 A * | 8/1994 | Schuman | B01D 29/23 |
| | | | 15/1.7 |
| 5,554,277 A * | 9/1996 | Rief | B01D 29/117 |
| | | | 210/167.12 |
| 5,692,542 A | 12/1997 | Smith | |
| 6,187,181 B1 * | 2/2001 | Stoltz | E04H 4/1263 |
| | | | 15/1.7 |
| 6,716,348 B1 * | 4/2004 | Morgan | B01D 29/27 |
| | | | 210/232 |
| 7,060,182 B2 | 6/2006 | Erlich et al. | |
| 8,168,065 B1 | 5/2012 | Gavigan et al. | |
| 2005/0035021 A1 | 2/2005 | Higer et al. | |
| 2008/0283456 A1 | 11/2008 | Charlotin | |
| 2015/0246304 A1 * | 9/2015 | Moessinger | B01D 35/0276 |
| | | | 210/232 |
| 2016/0002941 A1 | 1/2016 | Riedl | |
| 2016/0230623 A1 * | 8/2016 | Lapoint | F01M 11/03 |

OTHER PUBLICATIONS

Pentair Leaf Trap Canister, installation and repair.wmv; https://www.youtube.com/watch?v=RHEtesUaQNM publication date unknown.

\* cited by examiner

SWIMMING POOL CLEANER INLINE DEBRIS TRAP AND ASSOCIATED METHODS

FIELD OF INVENTION

The present invention generally relates to swimming pool cleaners, and more particularly to an inline filter operable with an automatic pool cleaner driven by a flow of water therethrough for providing movement along and cleaning of submerged surfaces of a swimming pool.

BACKGROUND

Automatic pool cleaners driven by a flow of water through the submerged cleaner through a pool filter for recycling back to the pool are well known. Typically, such pool cleaners have a flexible hose connected between the pool cleaner and a pump carried outside the swimming pool for causing water to be pumped through the pool cleaner and a filter operable close to the pump through which collected water is passed before recycling back into the swimming pool.

Embodiments of the present invention relate to inline leaf filters and debris traps used in combination with the automatic swimming pool cleaners. Typically, the pool cleaner is connected through the flexible hose a water inlet of the swimming pool filter system skimmer. The skimmer is connected to the swimming pool filter and the filter pump. Water is drawn into the skimmer by the filter pump and then passes through a sand filter or the like where water is then discharged back into the swimming pool. One known debris filter is described in U.S. Pat. No. 5,269,913, the disclosure of which is herein incorporated by reference.

As presented, while the use of traps in combination with pool cleaners is well-known, such traps typically have a housing made in two halves, with an inlet in one half and an outlet in the other half, to allow the interior of the trap to be cleaned of accumulated debris. A filter basket, net of the like is suspended within the housing between the inlet and the outlet. The debris trap is connected to the pool cleaner flexible hose near the filter system skimmer so that the debris trap floats just under the surface of the water. A rubber seal is used between connecting portions to prevent air from entering the otherwise closed system.

Typically, one portion of the debris trap must be dislodged from a mating portion, wherein connecting means typically includes a threaded connection or bayonet mounting connection. Well known connecting methods have proven to be difficult, or at least inconvenient to operate for removing debris from the trap.

The typical user of such debris filters is not a professional pool system operator and looks for convenience and ease in removing debris collected by the debris filter. Embodiments of the invention are directed to providing such ease and convenience.

SUMMARY

One embodiment according to the teachings of the present invention includes a debris trap that may comprise a container having an open end and an opposing closed end, wherein the closed end wall includes an outlet port extending therefrom, and wherein the open end is defined by a container rim. A cover for the container may include an arcuate shaped outside surface and an open end defined by a cover rim dimensioned from mating with the container rim, and wherein the cover includes an inlet port extending therethrough. To facilitate removal of the cover, a coupling may be connected to the container. The coupling may include an arm extending over the cover outside surface and contoured therewith, wherein the arm is movable from a locked position biasing the cover to the container to an unlocked position permitting removal of the cover from the container.

Yet further, The debris trap may include a filter basket carried within the container, wherein the filter basket has an open end and perforations formed in walls thereof. The filter basket may have a length dimension for extending a side wall thereof beyond the container rim when the basket end wall is biased against the container end wall for removably securing the basket within the container when in the locked position. The coupling may be pivotally connected to the container.

BRIEF DESCRIPTION OF DRAWINGS

For a fuller understanding of the invention, reference is made to the following detailed description, taken in connection with the accompanying drawings illustrating various embodiments of the present invention, in which.

DETAIL DESCRIPTION OF EMBODIMENTS

Figure 1:
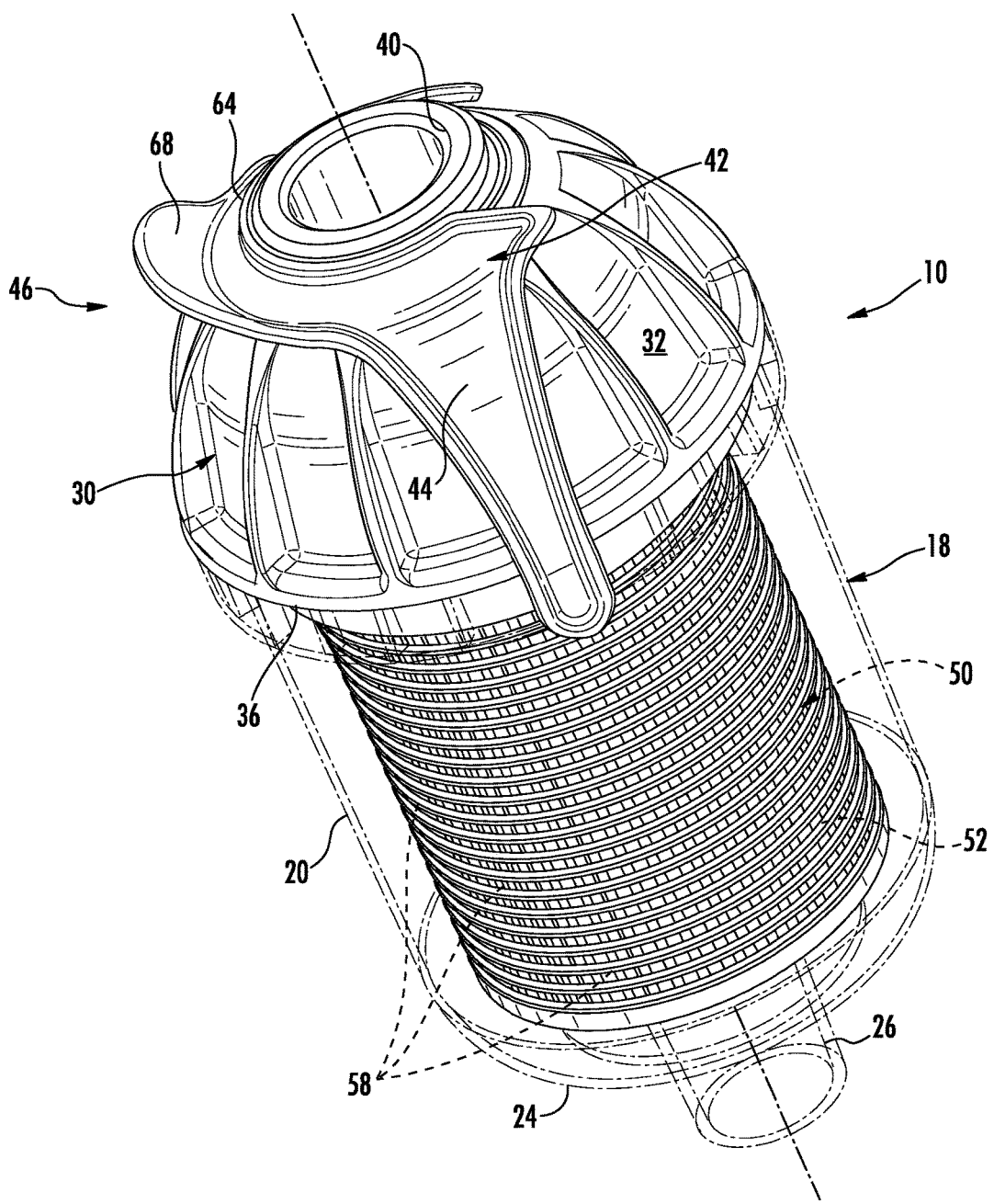
FIG. 1 is a top side perspective view of a debris trap according to the teachings of the present invention.

The present invention will now be described more fully hereinafter with reference to the accompanying drawings, in which preferred embodiments of the invention are shown by way of example only. This invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

With reference initially to FIGS. 1-4, one embodiment of the invention, herein described by way of example, includes a debris trap 10 operable in a flexible hose 12 between a swimming pool skimmer 14 and a submersible swimming pool cleaner 16 for collecting debris. For one embodiment herein described by way of example, the debris trap 10 comprises a container 18 having a cylindrical side wall 20 with an open end 22 and an opposing closed end wall 24. The closed end wall 24 includes an outlet port 26 extending through the end wall. The open end 22 of the container 18 is defined by a peripheral container rim 28.

Figure 2:
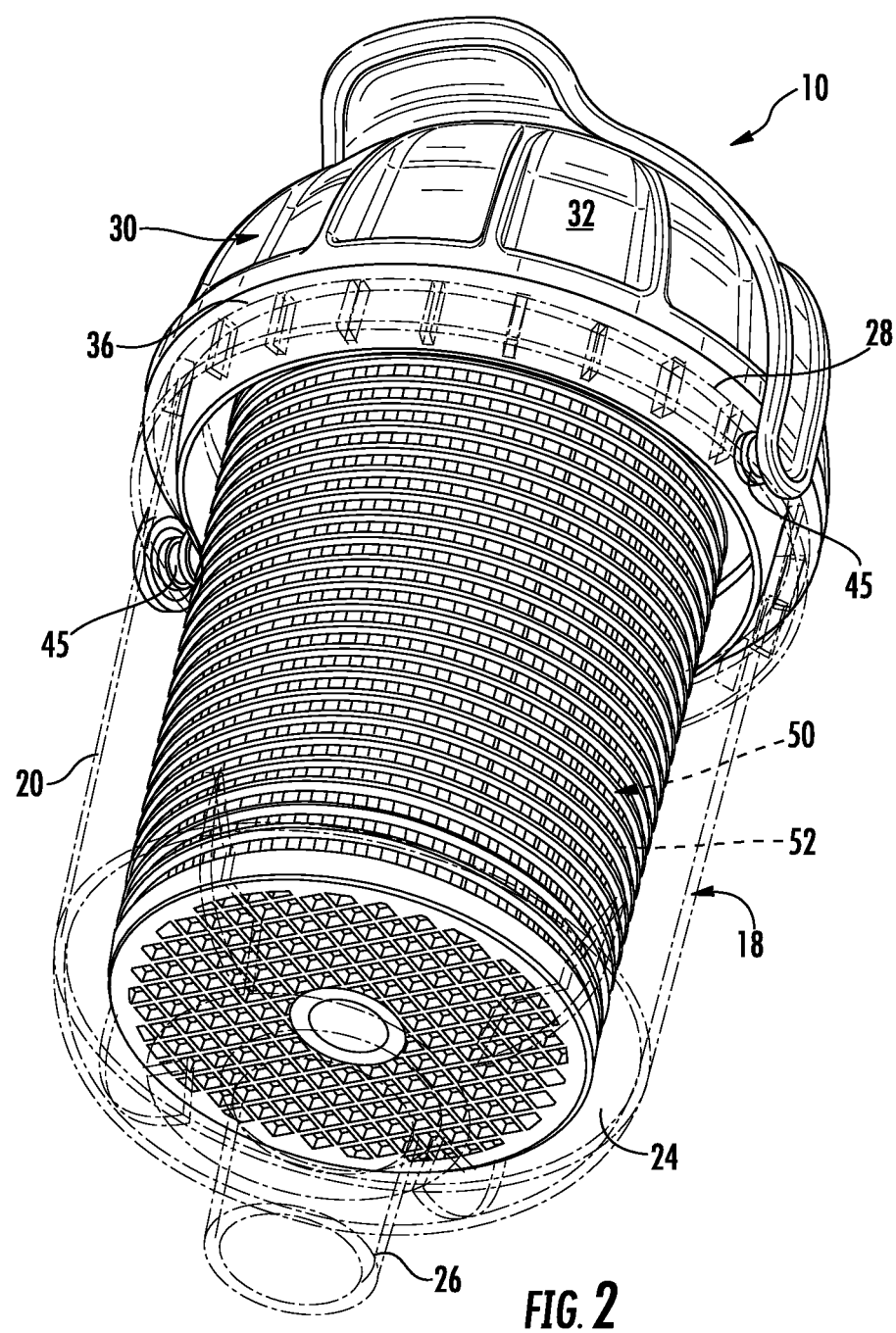
FIG. 2 is a bottom front perspective view of the debris trap of FIG. 1.
Figure 3:
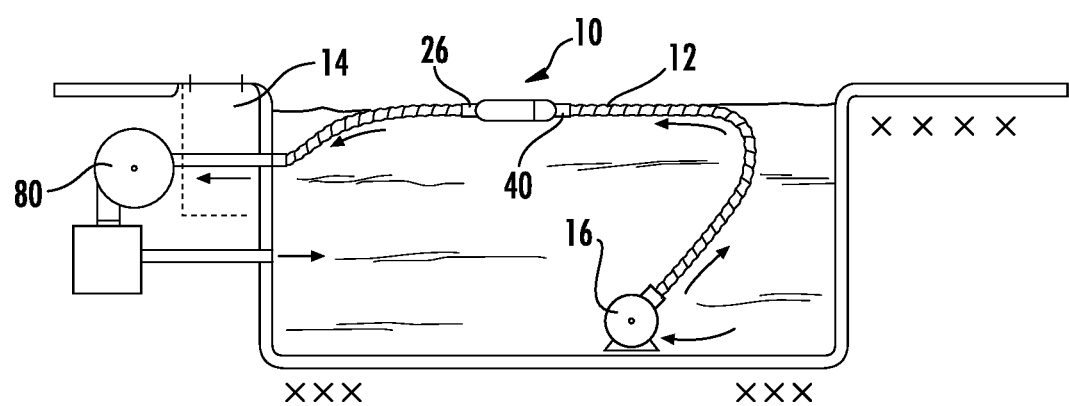
FIG. 3 is a diagrammatical illustration of a swimming pool system employing a debris filter.
Figure 4:
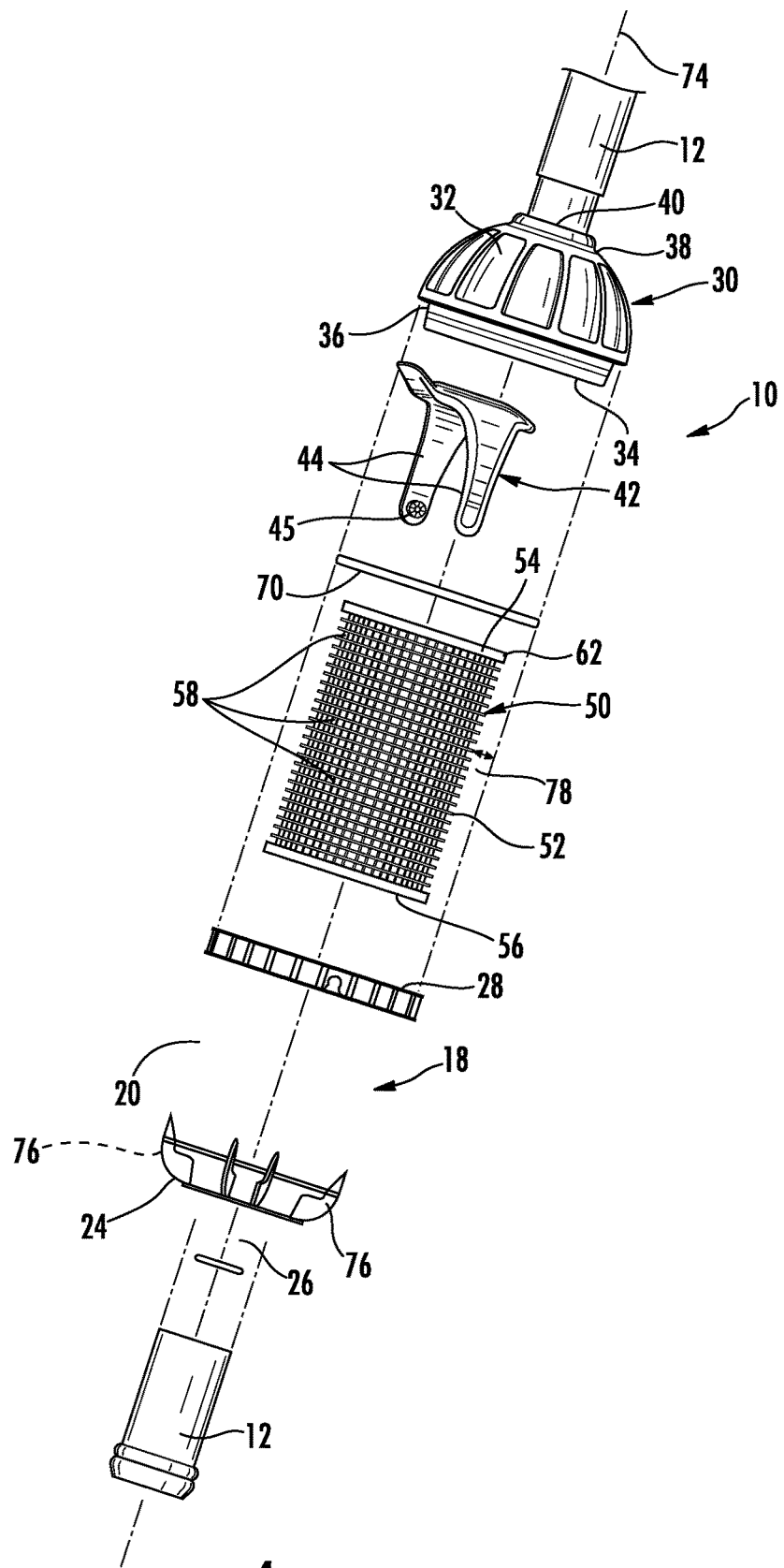
FIG. 4 is a perspective axially-exploded view of the embodiment of FIG. 1 illustrating hose connections therewith.
Figure 5:
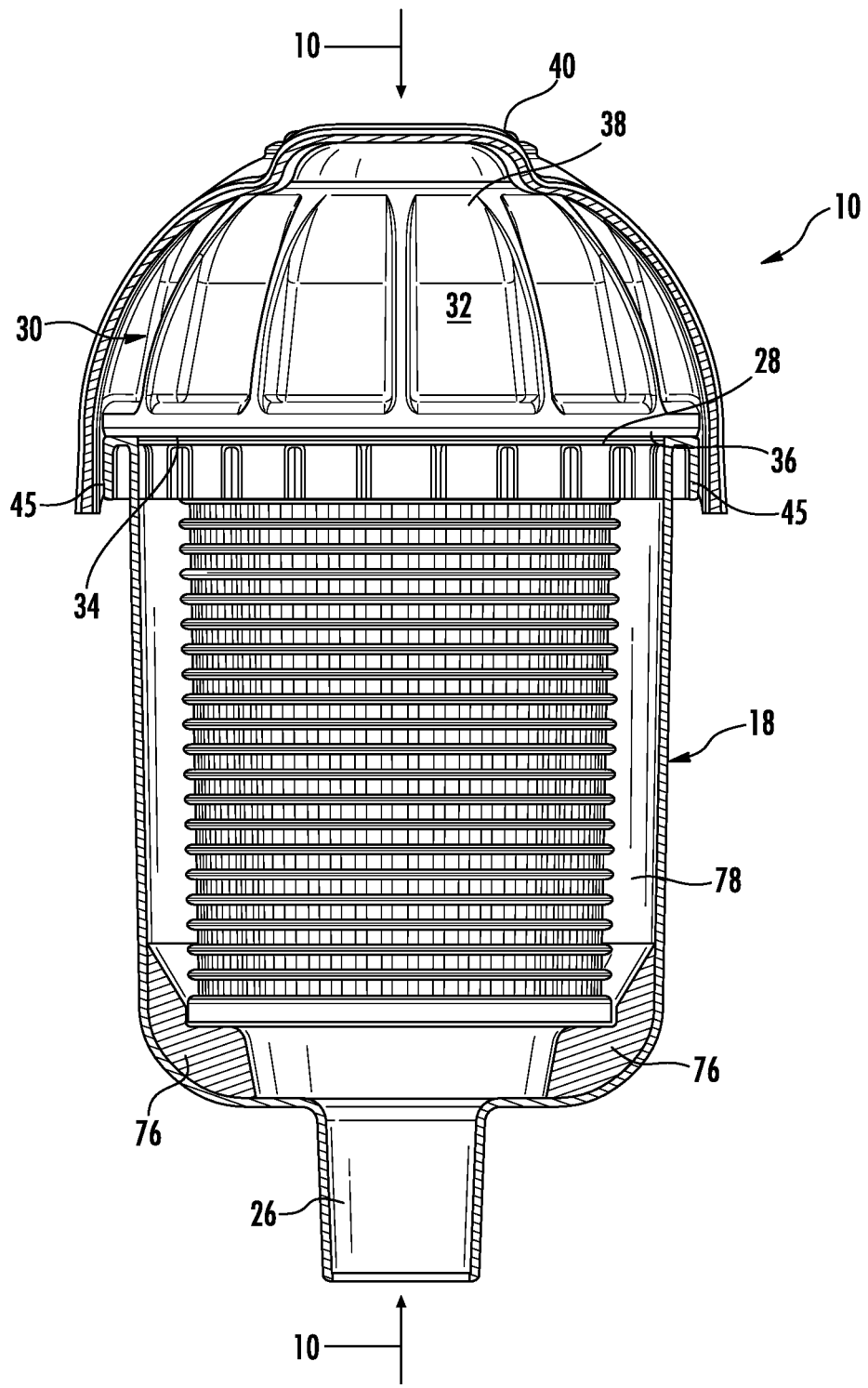
FIG. 5 is front elevation view of the embodiment of FIG. 1.
Figure 6:
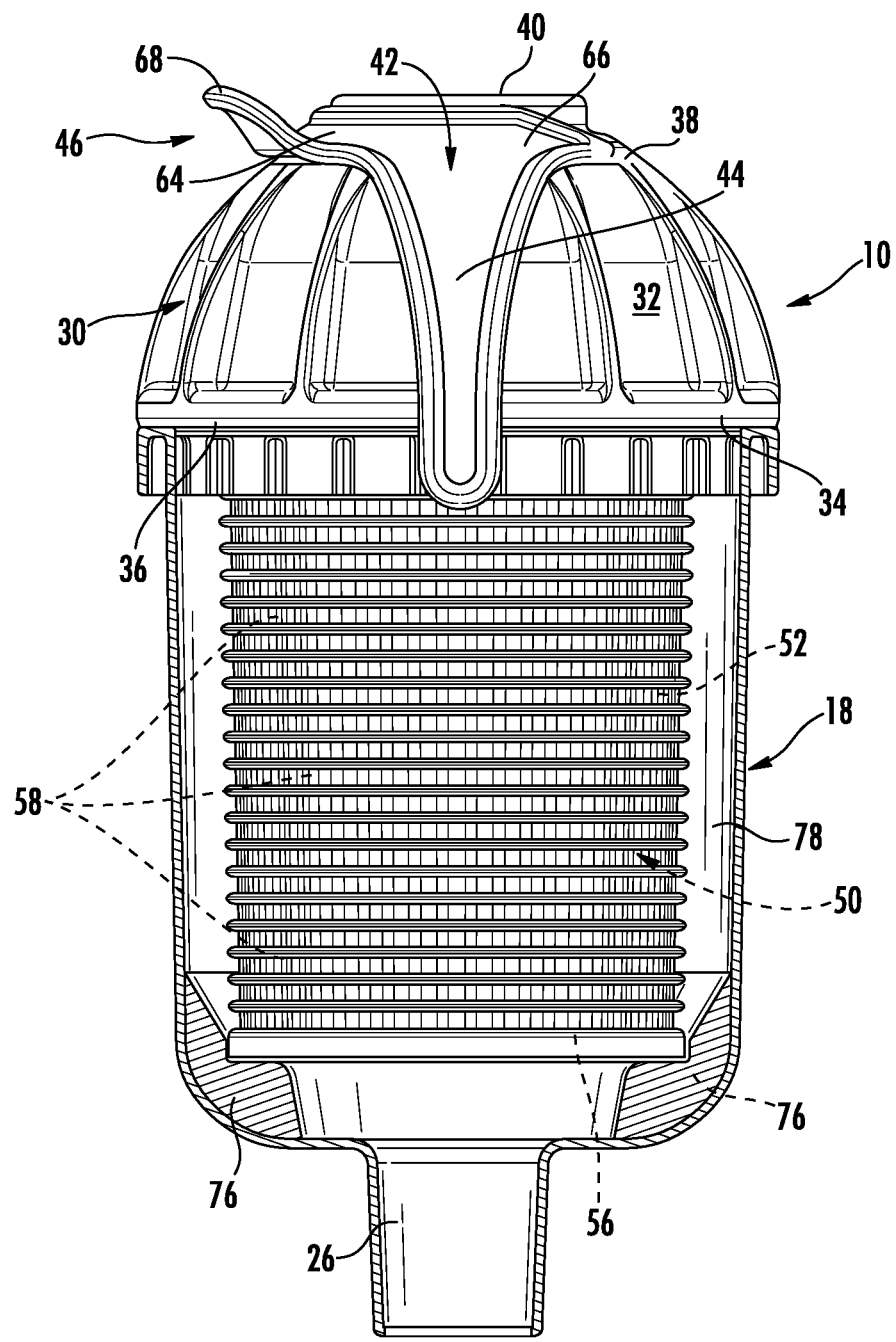
FIG. 6 is a side elevation view of the embodiment of FIG. 1.

With continued referee to FIGS. 1, 2 and 4, and now to FIGS. 5 and 6, a cover 30 operable with the cylindrically shaped container 18 has a generally dome shaped outside surface 32 and an open end 34. The open end 34 of the cover 30 is defined by a peripheral cover rim 36 dimensioned for mating with the peripheral container rim 28, wherein an apex 38 of the cover 30 includes an inlet port 40 extending through the cover.

Figure 5A:
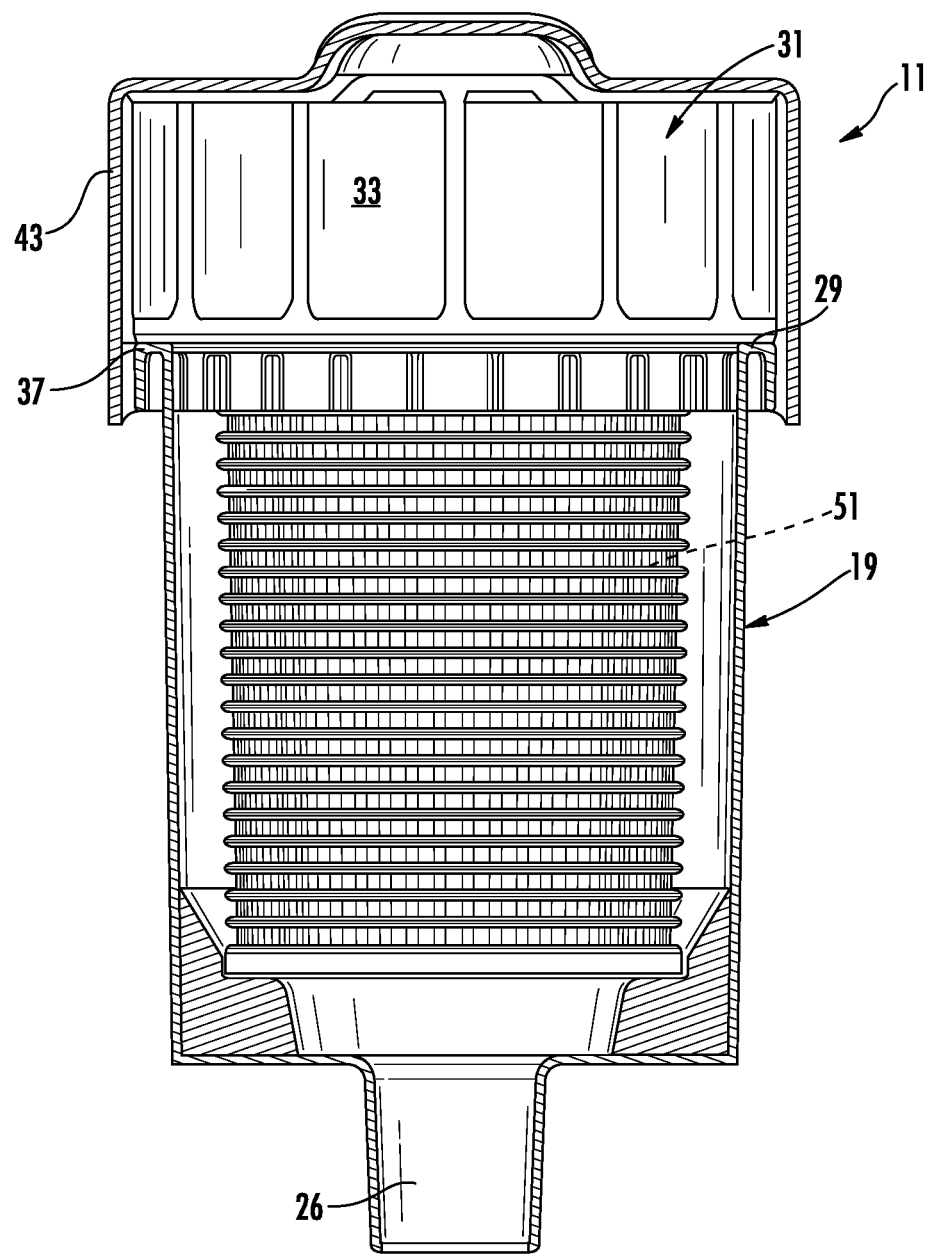
FIG. 5A is a front elevation view of an alternate embodiment having a generally rectangular shaped body and a generally cylindrically shaped cover.

It will come to the mind of those skilled in the art, now having the benefit of the teachings of the present invention that alternate embodiment may be made without departing from such teachings. By way of non-limiting example with reference to FIG. 5A, a debris filter 11 may include a rectangular shaped container 19, wherein a cover 31 includes a rectangular shaped rim 37 mating with a rectangular shaped container rim 29. The cover 31 may have an arcuate or cylindrical shaped outer surface 33, wherein a coupling 43 is rotatable thereabout, as above described. A filter basket 51 may likewise have a rectangular shape to conform and operate with the container 19.

Figure 7:
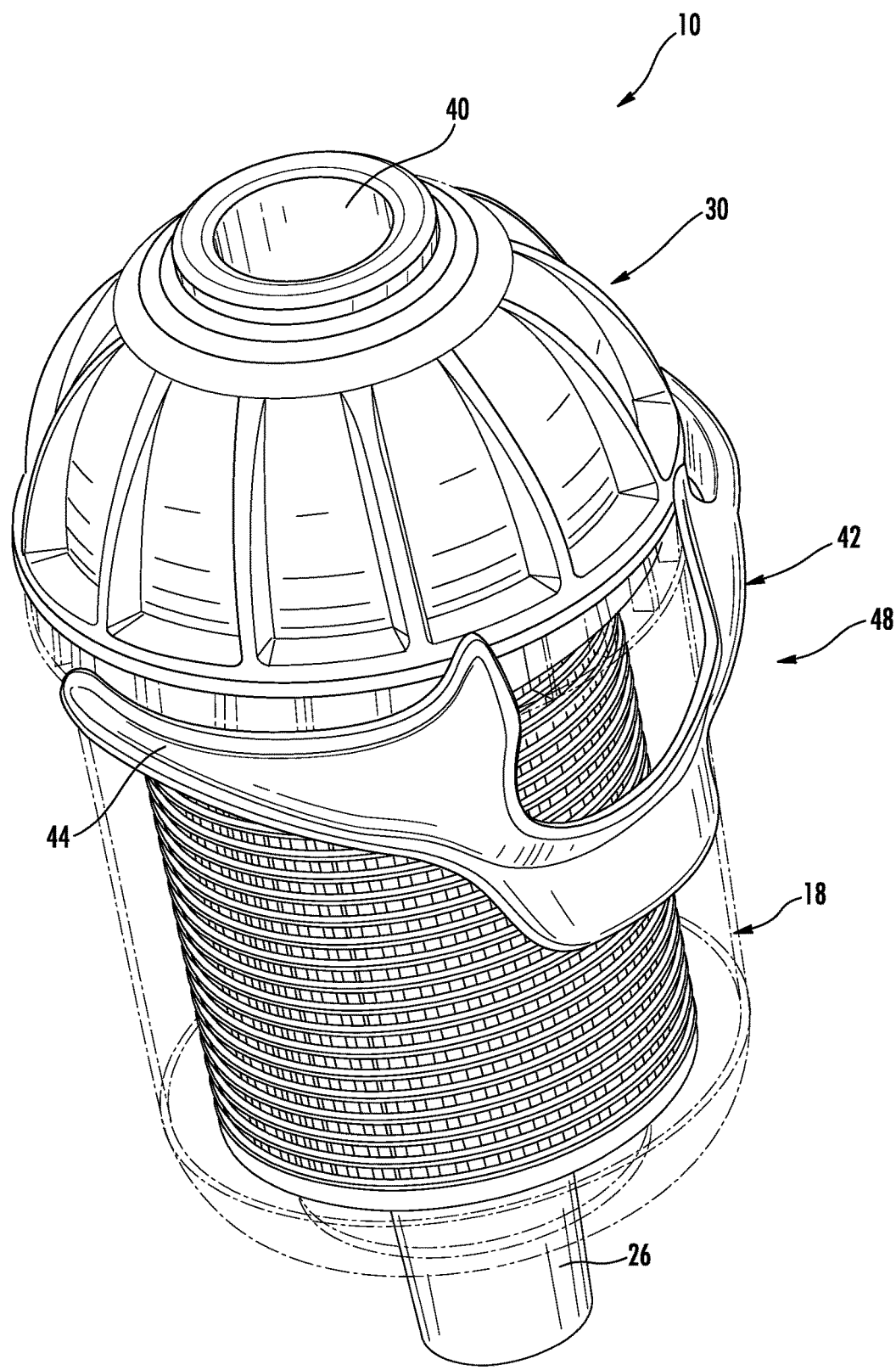
FIG. 7 is a top side perspective view of the embodiment of FIG. 1 illustrating the debris filter is an unlocked position.
Figure 8:
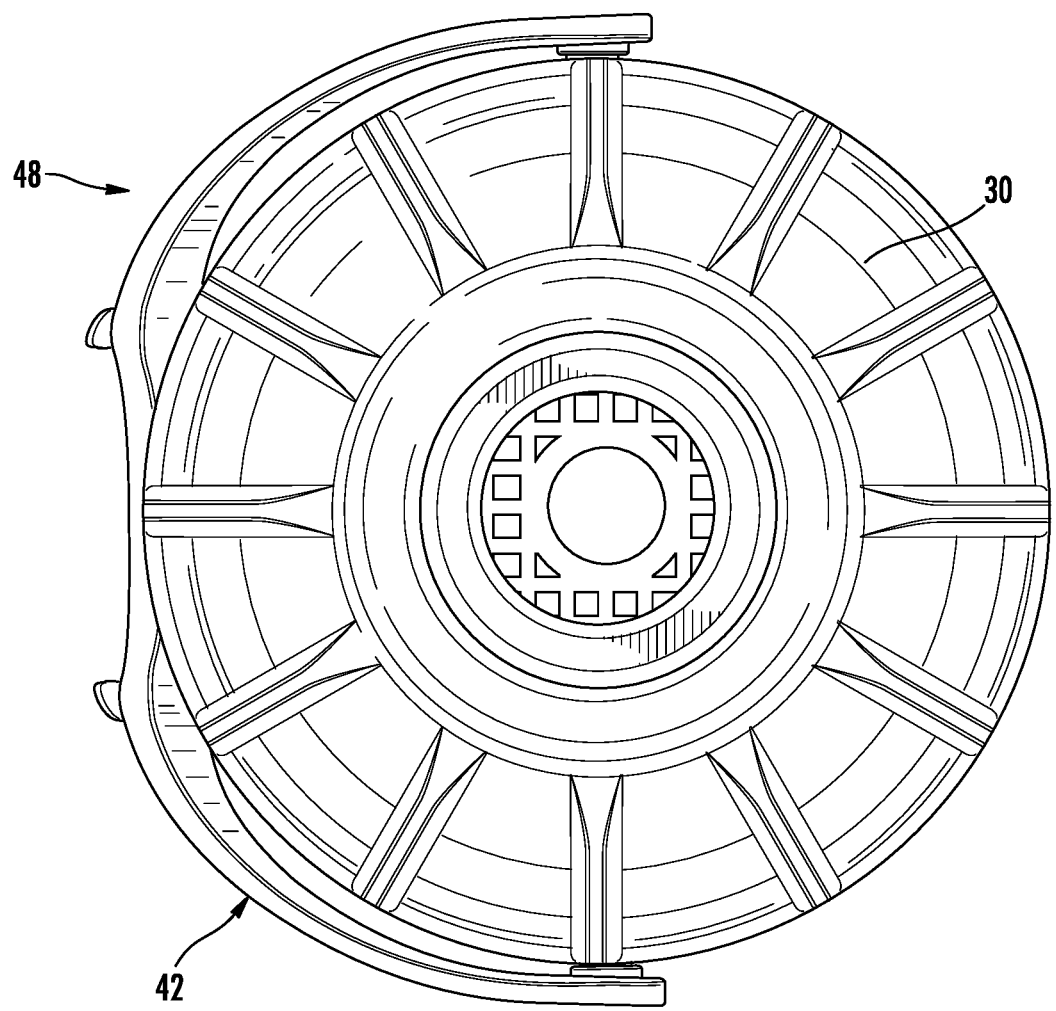
FIG. 8 is a top view of the embodiment illustration of FIG. 8.
Figure 9:
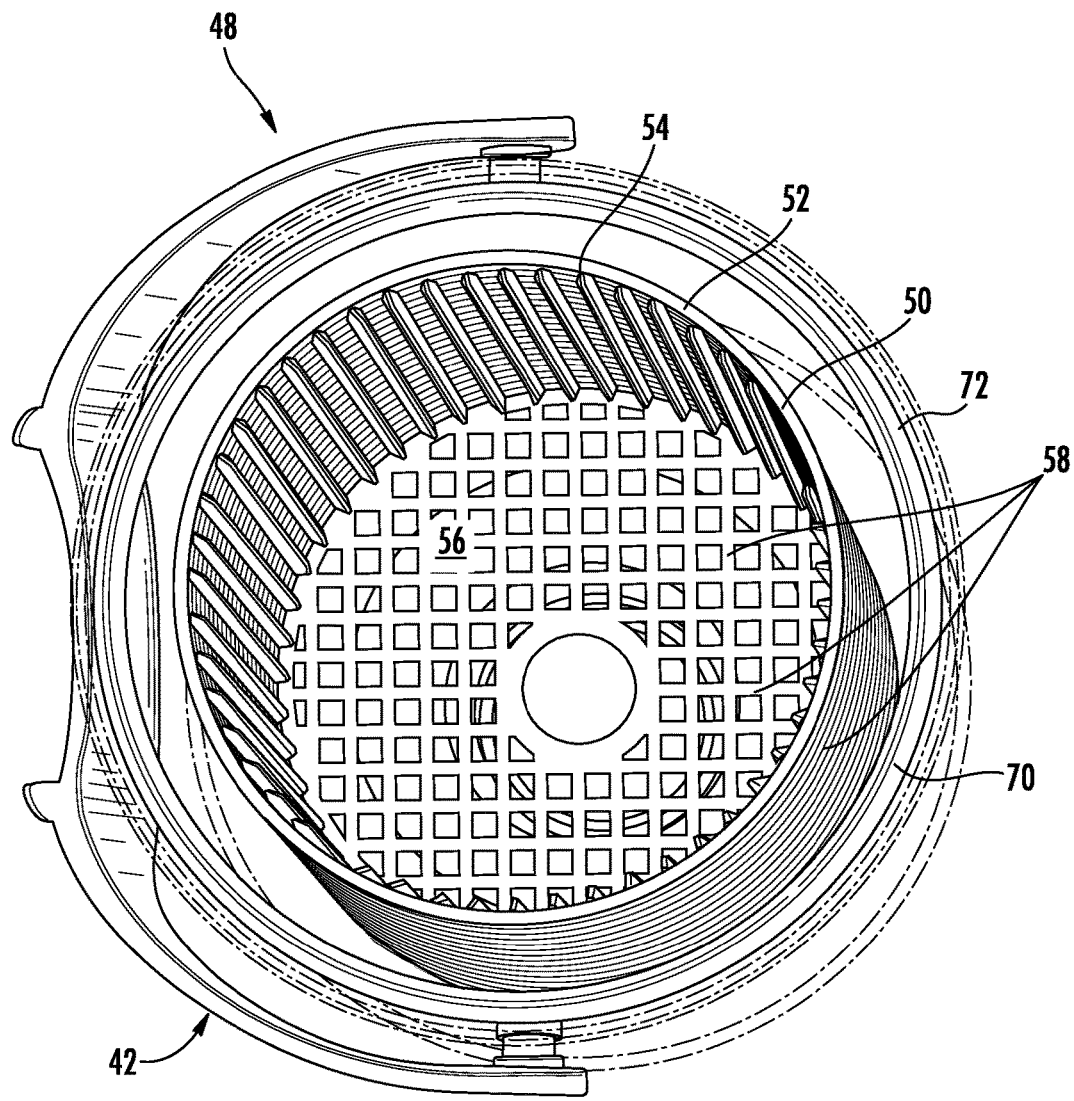
FIG. 9 is a top view of the embodiment of FIG. 1 wherein the cover is removed.

With continued reference to FIGS. 1, 4 and 6, and now to FIGS. 7-9, a coupling 42 is pivotally connected to the container 18. The coupling includes arms 44 extending over the cover outside surface 32 and contoured with and in close relation to the outside surface when the cover 30 is mated with the container 18. The arms 44 are rotatable from a locked position 46, as illustrated with reference again to FIGS. 1 and 6, biasing the cover 30 to the container 18 to an unlocked position 48, as illustrated with reference to FIGS. 7-9, for permitting removal of the cover 30 from the container 18.

Pivot pins 45 rotatably secure opposing extreme ends of the arms 44 to the container, as illustrated with reference to FIGS. 2 and 5.

Figure 10:
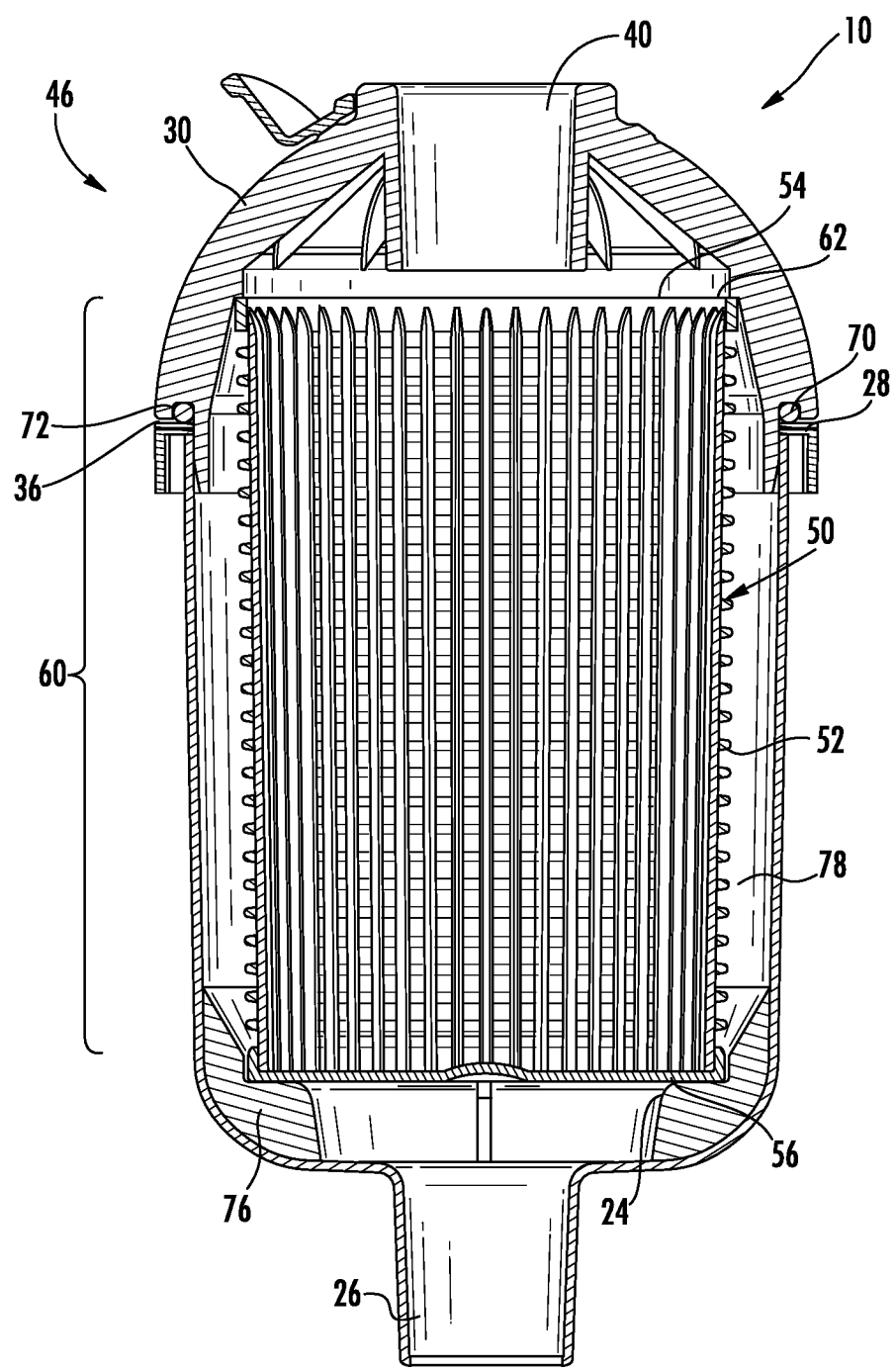
FIG. 10 is a cross-sectional view of the embodiment of FIG. 1 taken through lines 10-10 of FIG. 5.
Figure 11:
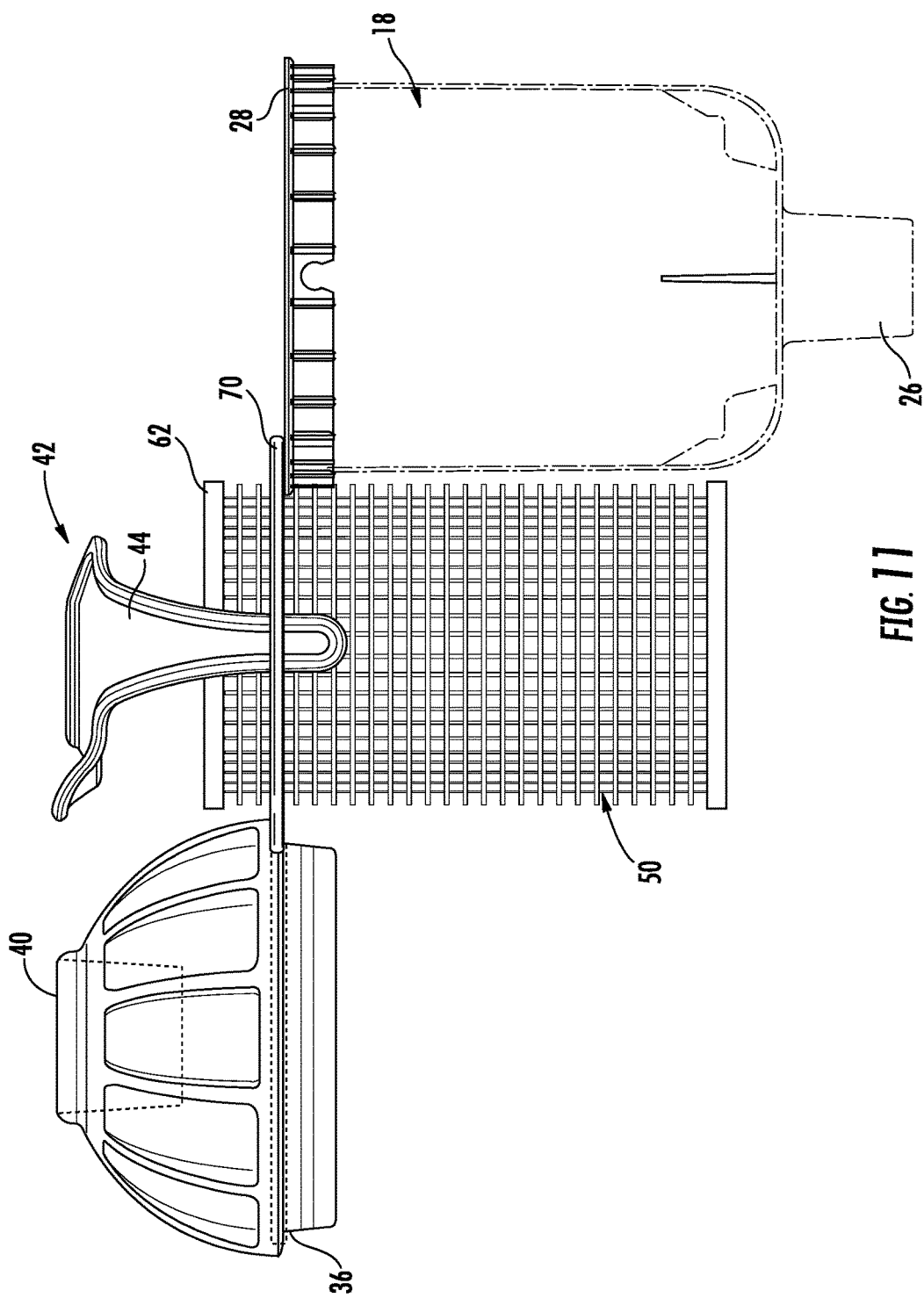
FIG. 11 is a transverse exploded view of the embodiment of FIG. 1.

As illustrated with continued to FIGS. 1, 2, 4 and 9, by way of example, and now also to FIGS. 10 and 11, a filter basket 50 includes a cylindrical side wall 52 dimensioned to fit within the cylindrical shaped container 18, herein described by way of non-limiting example. The filter basket 50 includes an open end 54 and an opposing closed end wall 56, wherein perforations 58 are formed in the side wall 52 and the end wall 56 sufficient for filtering out debris and allowing a flow of water therethrough. As illustrated with reference again to FIG. 10, the filter basket 50 includes a length dimension 60 for extending the basket side wall 52 beyond the container peripheral rim 28 when the basket end (or bottom as herein illustrated) wall 56 is biased against the container end (or bottom) wall 24. The basket open end 54 is defined by a basket peripheral rim 62. In the locked position 46, the cover 30 is biased against the basket peripheral rim 62 to removably secure the basket 50 within the container 18, as illustrated with reference again to 10.

With reference again to FIGS. 1 and 6, by way of example for the embodiment herein described, the coupling arms may form an arm having a yoke 64 formed at a central portion 66, wherein the yoke extends around the inlet port 40. A handle 68 may be formed with the yoke 64 for facilitating movement of the coupling 42 between the locked position 46 and the unlocked position 48, as above described.

As illustrated with reference to FIGS. 4, 9, 10 and 11, a seal ring 70 may be carried between the container rim 28 and the cover rim 36 for providing a sealing connection therebetween. A groove 72 may be formed in one or both the container rim 28 or the cover rim 36 for receiving the seal ring 70 within the groove.

As above illustrated, the container 18 may have its side wall 20 transparent for viewing the filter basket 50. Yet further, the inlet port 40 and the outlet port 26 may be aligned are aligned along a longitudinal axis 74 when in the locked position 46. As illustrated with reference again to FIGS. 4-6 and 10, guide elements 76 may be affixed within the container 18, proximate the container bottom closed end wall 24, wherein the guide elements are dimensioned for receiving the filter basket 50 for maintaining an annular gap 78 between the side walls 52, 20 of the filter basket and the container, respectively, when in the locked position 46.

By way of example with regard to use of the debris filter 10 and again with reference to FIG. 3, the flexible hose 12 may have one section connected between the swimming pool skimmer 14 and the outlet port 26. Another section of the flexible hose 12 is connected between the inlet port 40 of the debris trap 10 and the pool cleaner 16. When a swimming pool filter pump 80 is activated, water is drawn through the pool cleaner 16 and through the debris filter 10. Debris is collected in the filter basket 50. The perforations 58 in the basket allow water to flow out of the basket and toward the skimmer 14, leaving undesirable debris in the basket. While such a process is generally well known, it is also well known that it is generally difficult to open typical debris traps because of connections between their container and cover. The above described embodiments according to the teachings of the present invention solve such problems and provide a desirable debris trap that efficiently collects debris and allows users to easily access and clean out the debris filter.

Many modifications and other embodiments of the invention will come to the mind of those skilled in the art now having the benefit of the teachings presented in the foregoing descriptions and associated drawings. Therefore, it is understood that the invention is not to be limited to specific embodiments disclosed, and that modifications and embodiments are intended to be included within the scope of the appended claims.

That which is claimed is:

1. A debris trap comprising:
    a container having a container open end and an opposing container closed end, wherein the container closed end includes an outlet port extending therefrom, and wherein the container open end is defined by a container rim;
    a cover having an arcuate shaped outside surface and a cover open end, wherein the cover open end is defined by a cover rim dimensioned for mating with the container rim, and wherein the cover includes an inlet port extending therethrough; and
    a coupling connected to the container, the coupling having an arm extending over the cover outside surface and contoured therewith, wherein the arm is movable from a locked position biasing the cover to the container to an unlocked position permitting removal of the cover from the container, wherein the coupling is pivotally connected to the container, and wherein movement of the arm between the locked and unlocked positions includes the coupling rotating along the arcuate surface of the cover.

2. The debris trap according to claim 1, further comprising a filter basket carried within the container, the filter basket having an open end and perforations formed in walls thereof.

3. The debris trap according to claim 2, wherein the filter basket has a length dimension for extending a side wall thereof beyond the container rim when the basket end wall is biased against the container closed end for removably securing the basket within the container when in the locked position.

4. The debris trap according to claim 1, wherein the inlet and outlet ports are aligned along a longitudinal axis of the container when in the locked position.

5. The debris trap according to claim 1, further comprising a seal ring carried between the container and cover rims for sealing a connection therebetween.

6. The debris trap according to claim 5, wherein at least one of the container rim and cover rim includes a groove, and wherein the sealing ring is carried within the groove.

7. The debris trap according to claim 1, wherein the coupling arm includes a yoke formed at a central portion thereof, the yoke extending partially around the inlet port.

8. The debris trap according to claim 7, further comprising a handle formed with the yoke, the handle facilitating rotation of the coupling between the locked and unlocked positions.

9. The debris trap according to claim 1, further comprising guide elements affixed within the container for receiving the filter basket and maintaining an annular gap between the side walls of the filter basket and the container when in the locked position.

10. A debris trap operable in a hose between a swimming pool skimmer and a submersible swimming pool cleaner for collecting debris, the debris trap comprising:
   a container having a side wall with container open end and an opposing closed end wall thereof, wherein the closed end wall includes an outlet port extending therethrough, and wherein the container open end is defined by a peripheral container rim;
   a cover having a generally arcuate shaped outside surface and a cover open end, wherein the cover open end is defined by a peripheral cover rim dimensioned from mating with the peripheral container rim, and wherein an apex of the cover includes an inlet port extending through the cover;
   a coupling operable for connection to the container, the coupling having an arm extending over the cover outside surface and contoured therewith when the cover is mated with the container, the arm moveable from a locked position biasing the cover to the container to an unlocked position permitting removal of the cover from the container, wherein the arm is pivotally connected to the container and movement of the arm between the locked and unlocked positions includes the arm rotating on the arcuate surface of the cover; and
   a filter basket having a cylindrical side wall dimensioned to fit within the container, the filter basket having an open end and an opposing closed end wall, wherein perforations are formed in the side and end walls sufficient for filtering debris, the filter basket having a length dimension for extending the side wall beyond the container peripheral rim when the basket end wall is biased against the container end wall, wherein the basket open end is defined by a basket peripheral rim, and wherein in the locked position, the cover is biased against the basket peripheral rim to thus removably secure the basket within the container.

11. The debris trap according to claim 10, wherein the arcuate outside surface of the cover comprises a dome shape.

12. The debris trap according to claim 10, wherein the cylindrical side wall is sufficiently transparent for viewing the filter.

13. The debris trap according to claim 10, wherein the inlet and outlet ports are aligned along a longitudinal axis of the container when in the locked position.

14. The debris trap according to claim 10, further comprising a seal ring carried between the container and cover peripheral rims for sealing a connection therebetween.

15. The debris trap according to claim 14, wherein at least one of the container rim and cover rim includes a groove, and wherein the sealing ring is carried within the groove.

16. The debris trap according to claim 10, wherein the coupling arm includes a yoke formed at a central portion thereof, the yoke extending around the inlet port.

17. The debris trap according to claim 16, further comprising a handle formed with the yoke, the handle facilitating movement of the coupling between the locked and unlocked positions.

18. The debris trap according to claim 10, further comprising pivot pins rotatably securing opposing extreme ends of the arm to the container.

19. The debris trap according to claim 10, further comprising guide elements affixed within the container proximate the container end wall, wherein the guide elements are dimensioned for receiving the filter basket therein for maintaining an annular gap between the side walls of the filter basket and the container when in the locked position.

* * * * *